(12) United States Patent
Suzuki

(10) Patent No.: US 6,865,463 B2
(45) Date of Patent: Mar. 8, 2005

(54) ELECTRICALLY-POWERED STEERING APPARATUS

(75) Inventor: Hiroshi Suzuki, Aichi-Pref. (JP)

(73) Assignee: Toyoda Machine Works, Ltd., Kariya (JP)

( * ) Notice: Subject to any disclaimer, the term of this patent is extended or adjusted under 35 U.S.C. 154(b) by 9 days.

(21) Appl. No.: 10/304,679

(22) Filed: Nov. 27, 2002

(65) Prior Publication Data

US 2003/0100981 A1 May 29, 2003

(30) Foreign Application Priority Data

Nov. 28, 2001 (JP) ........................................ 2001-361984

(51) Int. Cl.[7] .............................................. B62D 5/04
(52) U.S. Cl. ............................ 701/43; 701/41; 701/42; 180/443; 180/446
(58) Field of Search ............................ 701/41, 42, 43; 180/443, 446

(56) References Cited

U.S. PATENT DOCUMENTS

| | | | | |
|---|---|---|---|---|
| 5,008,823 A | * | 4/1991 | Takahashi | 701/34 |
| 5,029,466 A | | 7/1991 | Nishihara et al. | |
| 5,048,629 A | * | 9/1991 | Abe et al. | 180/412 |
| 5,080,186 A | * | 1/1992 | Elser et al. | 180/422 |
| 5,257,191 A | * | 10/1993 | Takehara et al. | 701/43 |
| 5,343,393 A | * | 8/1994 | Hirano et al. | 701/41 |
| 5,394,760 A | | 3/1995 | Persson et al. | |
| 5,506,776 A | * | 4/1996 | Fushimi et al. | 701/41 |
| 5,554,969 A | * | 9/1996 | Eguchi | 340/438 |
| 6,078,851 A | * | 6/2000 | Sugitani | 701/34 |

FOREIGN PATENT DOCUMENTS

| | | | |
|---|---|---|---|
| EP | 0 338 559 | 10/1989 | |
| EP | 1 035 002 | 9/2000 | |
| GB | 2 352 215 | 1/2001 | |
| JP | 11148818 A | * 6/1999 | ........... G01B/21/22 |

OTHER PUBLICATIONS

English translation of JP 1114818 A.*

* cited by examiner

Primary Examiner—Michael J. Zanelli
Assistant Examiner—Eric M. Gibson
(74) Attorney, Agent, or Firm—Oblon, Spivak, McClelland, Maier & Neustadt, P.C.

(57) ABSTRACT

An electrically-powered steering apparatus capable of detecting abnormality in a first angle detector and a second angle detector includes a steering shaft 12 and a pinion shaft 13 connected to each other through a torsion bar 14. If a differential ($|\theta 1-\theta 2|$) between the steering detection angle $\theta 1$ and the steering detection angle $\theta 2$ is equal to or over a predetermined value $\theta 0$ for a predetermined time, it is detected that abnormality occurs in the angle sensor 15 or the angle sensor 16.

5 Claims, 4 Drawing Sheets

[First embodiment]

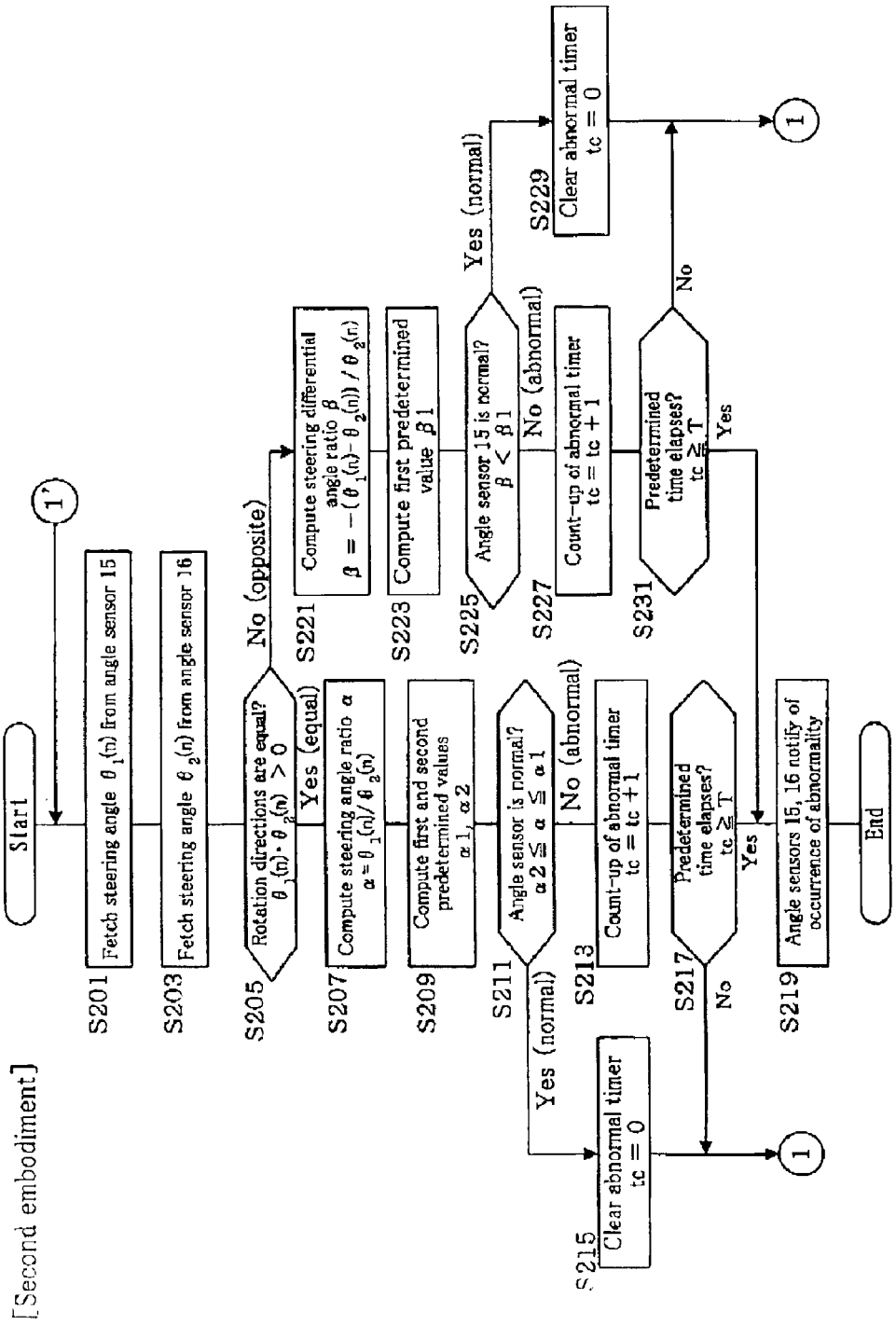

ELECTRICALLY-POWERED STEERING APPARATUS

BACKGROUND OF THE INVENTION

1. Field of the Invention

The present invention relates to an electrically-powered steering apparatus for assisting steering of wheels by detecting steering condition and generating an assist force corresponding to the steering condition by means of a motor.

2. Description of Related Art

A conventional electrically-powered steering apparatus detects a steering torque generated in a steering shaft by means of a torque sensor and determines a current instruction value to be outputted to a driving circuit for driving a motor based on this detected steering torque, a vehicle velocity detected by other sensor and the like. After that, a predetermined assist torque is generated in that motor.

That is, according to this assist control, the steering torque is detected from a twisting amount of a torsion bar or the like in which an input shaft coupled with a steering wheel and an output shaft coupled with a steering mechanism are connected to each other such that they can be rotated relatively to each other. A CPU computes a current instruction value based on this steering torque or the like and generates an assist force corresponding to the steering condition.

In the electrically-powered steering apparatus, not only the assist control based on the steering torque, vehicle velocity or the like but also a control taking into account the steering angle of a steering wheel, for example, self aligning control may be demanded depending on the case. In such a case, steering angle data detected by the steering angle sensor of the steering shaft needs to be inputted to the CPU.

However, the conventional electrically-powered steering apparatus needs to receive steering angle data detected by the steering angle sensor provided on the steering shaft through a control device provided separately from a control device for the electrically-powered steering apparatus. For this reason, data communication control needs to be provided between the both control devices and further, there arise various problems such as reliability of that data communication, securing of fail safe. Therefore, it has been considered that the assist control based on the steering angle is generally impossible.

SUMMARY OF THE INVENTION

The present invention has been achieved to solve the above-described problems and an object of the present invention is to provide an electrically-powered steering apparatus capable of not only achieving assist control based on the steering angle but also detecting abnormality in a first angle detecting means and a second angle detecting means.

In order to achieve the above object, according to the present invention, an electrically-powered steering apparatus for assisting steering of wheels by detecting a steering condition and generating an assist force corresponding to the steering condition by means of a motor, comprising:

a torsional member for connecting a steering shaft coupled with a steering wheel and a steering mechanism shaft coupled with a steering mechanism to each other such that they can be rotated relatively to each other;

a first angle detecting means for detecting a rotation angle of said steering shaft;

a second angle detecting means for detecting a rotation angle of said steering mechanism shaft;

an assist force determining means for determining said assist force generated by said motor based on at least one of the rotation angle of said steering shaft detected by said first angle detecting means and the rotation angle of said steering mechanism shaft detected by said second angle detecting means; and an abnormality detecting means for if a differential between the rotation angle of said steering shaft detected by said first angle detecting means and the rotation angle of said steering mechanism shaft detected by said second angle detecting means is equal to or over a predetermined valve, detecting the occurrence of abnormality in said first angle detecting means or said second angle detecting means.

According to the present invention, a steering shaft and a steering mechanism shaft are connected to each other through a torsional member such that they can be rotated relatively to each other. The rotation angle of the steering shaft and the rotation angle of the steering mechanism shaft are detected by a first angle detecting means and a second angle detecting means respectively. Then, an assist force to be generated by a motor is determined based on at least one of the rotation angle of the steering shaft and the rotation angle of the steering mechanism shaft by an assist force determining means. Further, if the differential between the rotation angle of the steering shaft detected by the second angle detecting means and the rotation angle of the steering mechanism shaft detected by the second angle detecting means is equal to or over a predetermined value, an abnormality detecting means detects that abnormality occurs in the first angle detecting means and the second angle detecting means. Consequently, the rotation angle of the steering shaft can be detected and a torsion amount of the torsional member can be detected as a torsion angle from at least one of the rotation angle of the steering shaft and the rotation angle of the steering mechanism shaft. Thus, an assist control taking into account the steering angle of the steering wheel can be achieved. Further, it can be detected that abnormality occurs in the first angle detecting means or the second angle detecting means from the differential between the rotation angle of the steering shaft and the rotation angle of the steering mechanism shaft. Therefore, not only the assist control based on the steering angle is achieved, but also abnormality in the first angle detecting means and the second angle detecting means can be detected.

According to the present invention, an electrically-powered steering apparatus for assisting steering of wheels by detecting a steering condition and generating an assist force corresponding to the steering condition by means of a motor, comprising:

a torsional member for connecting a steering shaft coupled with a steering wheel and a steering mechanism shaft coupled with a steering mechanism to each other such that they can be rotated relatively to each other;

a first angle detecting means for detecting a rotation angle of said steering shaft;

a second angle detecting means for detecting a rotation angle of said steering mechanism shaft;

an assist force determining means for determining said assist force generated by said motor based on at least one of the rotation angle of said steering shaft detected by said first angle detecting means and the rotation angle of said steering mechanism shaft detected by said second angle detecting means; and an abnormality detecting means for if a condition in which the differential between the rotation angle of said steering shaft detected by said first angle detecting means and the rotation angle of said steering mechanism shaft detected by said second angle detecting means is equal to or over a predetermined value continues for a predetermined time, detecting that abnormality occurs in said first angle detecting means or said second angle detecting means.

According to the present invention, a steering shaft and a steering mechanism shaft are connected to each other through a torsional member such that they can be rotated relatively to each other. The rotation angle of the steering shaft and the rotation angle of the steering mechanism shaft are detected by a first angle detecting means and a second angle detecting means respectively. Then, the assist force to be generated by the motor is determined based on at least one of the rotation angle of the steering shaft and the rotation angle of the steering mechanism shaft by an assist force determining means. When a condition in which the differential between the rotation angle of the steering shaft detected by the first angle detecting means and the rotation angle of the steering mechanism shaft detected by the second angle detecting means is equal to or over a predetermined value continues for a predetermined time, the abnormality detecting means detects that abnormality occurs in the first angle detecting means or the second angle detecting means. Consequently, the rotation angle of the steering shaft can be detected and the torsion amount of the torsional member can be detected as a torsion angle from at least one of the rotation angle of the steering shaft and the rotation angle of the steering mechanism shaft, so that the assist control taking into account the steering angle of the steering wheel can be executed. Further, because the differential between the rotation angle of the steering shaft and the rotation angle of the steering mechanism shaft continued to be detected for the predetermined time, it can be certainly detected securely that abnormality occurs in the first angle detecting means or the second angle detecting means. Therefore, not only the assist control based on the steering angle is achieved, but also abnormality in the first angle detecting means and the second angle detecting means can be detected.

In order to achieve the above object, according to the present invention, an electrically-powered steering apparatus for assisting steering of wheels by detecting a steering condition and generating an assist force corresponding to the steering condition by means of a motor, comprising:

a torsional member for connecting a steering shaft coupled with a steering wheel and a steering mechanism shaft coupled with a steering mechanism to each other such that they can be rotated relatively to each other;

a first angle detecting means for detecting a rotation angle of said steering shaft;

a second angle detecting means for detecting a rotation angle of said steering mechanism shaft;

an assist force determining means for determining said assist force generated by said motor based on at least one of the rotation angle of said steering shaft detected by said first angle detecting means and the rotation angle of said steering mechanism shaft detected by said second angle detecting means; and an abnormality detecting means for if the ratio $\alpha 10$ between the rotation angle of said steering shaft detected by said first angle detecting means and the rotation angle of said steering mechanism shaft detected by said second angle detecting means is in the range between a predetermined value $\alpha 11$ and a predetermined value $\alpha 12$, detecting that abnormality occurs in said first angle detecting means or said second angle detecting means.

According to the present invention, a steering shaft and a steering mechanism shaft are connected to each other through a torsional member such that they can be rotated relatively to each other. The rotation angle of the steering shaft and the rotation angle of the steering mechanism shaft are detected by a first angle detecting means and a second angle detecting means respectively. Then, the assist force to be generated by the motor is determined based on at least one of the rotation angle of the steering shaft and the rotation angle of the steering mechanism shaft by an assist force determining means. When the ratio $\alpha 10$ between the rotation angle of the steering shaft detected by the first angle detecting means and the rotation angle of the steering mechanism shaft detected by the second angle detecting means in the range between is the predetermined value $\alpha 11$ and the predetermined value $\alpha 12$, the abnormality detecting means detects that abnormality occurs in the first angle detecting means or the second angle detecting means. Consequently, the rotation angle of the steering shaft can be detected and the torsion amount of the torsional member can be detected as a torsion angle from at least one of the rotation angle of the steering shaft and the rotation angle of the steering mechanism shaft, so that the assist control taking into account the steering angle of the steering wheel can be executed. Further, it can be detected that abnormality occurs in the first angle detecting means and the second angle detecting means from the ratio $\alpha 10$ between the rotation angle of the steering shaft and the rotation angle of the steering mechanism shaft. Therefore, not only the assist control based on the steering angle is achieved, but also abnormality in the first angle detecting means and the second angle detecting means can be detected, According to the present invention, an electrically-powered steering apparatus for assisting steering of wheels by detecting a steering condition and generating an assist force corresponding to the steering condition by means of a motor, comprising:

a torsional member for connecting a steering shaft coupled with a steering wheel and a steering mechanism shaft coupled with a steering mechanism to each other such that they can be rotated relatively to each other;

a first angle detecting means for detecting a rotation angle of said steering shaft;

a second angle detecting means for detecting a rotation angle of said steering mechanism shaft;

an assist force determining means for determining said assist force generated by said motor based on at least one of the rotation angle of said steering shaft detected by said first angle detecting means and the rotation angle of said steering mechanism shaft detected by said second angle detecting means; and an abnormality detecting means for if a condition in which the ratio $\alpha 10$ between the rotation angle of said steering shaft detected by said first angle detecting means and the rotation angle of said steering mechanism shaft detected by said second angle detecting means is in the range between a predetermined value $\alpha 11$ and a predetermined value $\alpha 12$ continues for a predetermined time, detecting that abnormality occurs in said first angle detecting means or said second angle detecting means.

According to the present invention, a steering shaft and a steering mechanism shaft are connected to each other through a torsional member such that they can be rotated relatively to each other. The rotation angle of the steering shaft and the rotation angle of the steering mechanism shaft are detected by a first angle detecting means and a second angle detecting means respectively. Then, the assist force to be generated by the motor is determined based on at least one of the rotation angle of the steering shaft and the rotation angle of the steering mechanism shaft by an assist force determining means. When a condition in which the ratio α10 between the rotation angle of the steering shaft detected by the first angle detecting means and the rotation angle of the steering mechanism shaft detected by the second angle detecting means is in the range between the predetermined value α11 and the predetermined value α12 continues for a predetermined time, the abnormality detecting means detects that abnormality occurs in the first angle detecting means or the second angle detecting means. Consequently, the rotation angle of the steering shaft can be detected and the torsion amount of the torsional member can be detected as a torsion angle from at least one of the rotation angle of the steering shaft and the rotation angle of the steering mechanism shaft, so that the assist control taking into account the steering angle of the steering wheel can be executed. Further, because the ratio α10 between the rotation angle of the steering shaft and the rotation angle of the steering mechanism shaft continues to be detected for the predetermined time, it can be certainly detected that abnormality occurs in the first angle detecting means and the second angle detecting means. Therefore, not only the assist control based on the steering angle is achieved, but also abnormality in the first angle detecting means and the second angle detecting means can be detected.

In accordance with the more preferred teaching of the present invention, said predetermined value α11 and predetermined value α12 change based on the rotation angle of said steering shaft detected by said first angle detecting means or the rotation angle of said steering mechanism shaft detected by said second angle detecting means.

According to the present invention, the predetermined value α11 and the predetermined value α12 change based on the rotation angle of the steering shaft detected by the first angle detecting means and the rotation angle of the steering mechanism shaft detected by the second angle detecting means. Thus, this apparatus can determine whether or not abnormality exists in the first angle detecting means or the second angle detecting means corresponding dynamically to changes in the rotation angle of the steering shaft or the rotation angle of the steering mechanism shaft angle detecting means. Therefore, the abnormality in the first angle detecting means and the second angle detecting means can be detected further accurately.

BRIEF DESCRIPTION OF THE DRAWINGS

FIG. 4 is a flow chart showing the flow of abnormality detection processing of the angle sensor according to a second embodiment.

DESCRIPTION OF THE PREFERRED EMBODIMENTS

In the following embodiments, the descriptions are made on the basis of a case where the electrically-powered steering apparatus according to the present invention is applied to a motor vehicle. Hereinafter, the preferred embodiments of the electrically-powered steering apparatus according to the present invention will be described with reference to the accompanying drawings.

[First Embodiment]

First, the main structure of the electrically-powered steering apparatus 10 of the first embodiment will be described with reference to FIG. 1. This electrically-powered steering apparatus 10 of the first embodiment corresponds to the electrically-powered steering apparatus.

Figure 1:
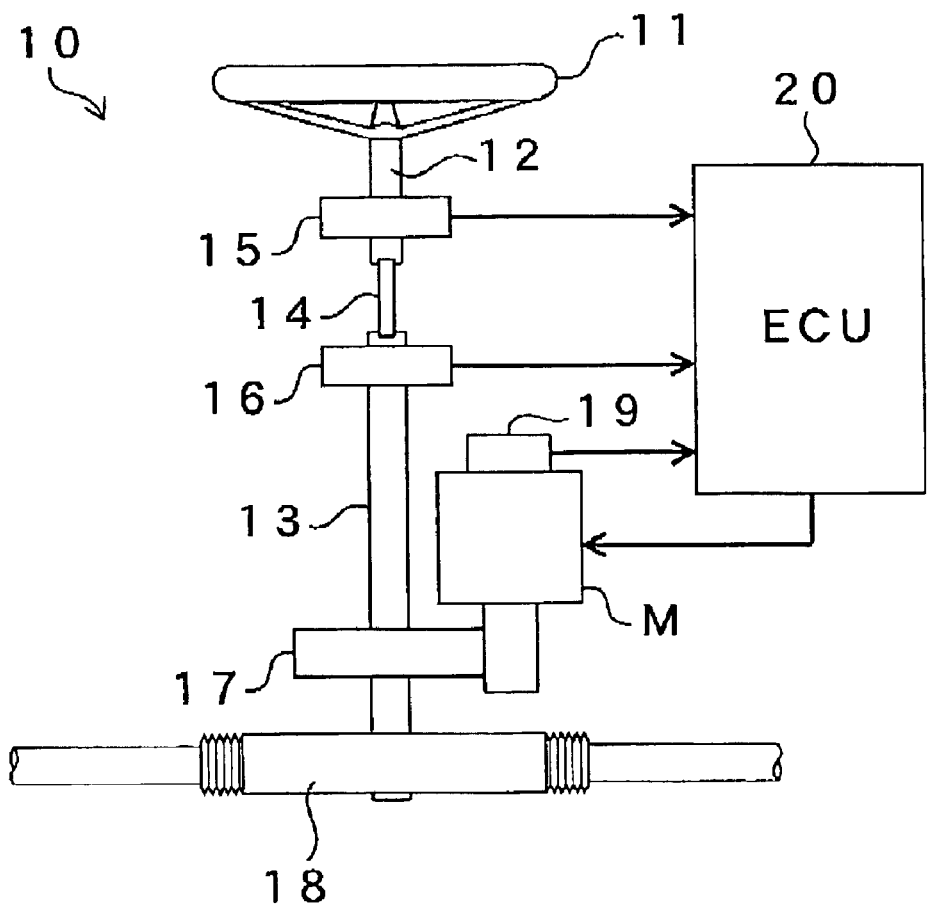
FIG. 1 is a block diagram showing the main structure of the electrically-powered steering apparatus according to a first embodiment of the present invention.

As shown in FIG. 1, the electrically-powered steering apparatus 10 comprises mainly a steering wheel 11, a steering shaft 12, a pinion shaft 13, a torsion bar 14, angle sensors 15, 16, a reduction gear 17, a rack pinion 18, a motor rotation angle sensor 19, motor M, ECU 20 and the like. Steering condition by the steering wheel 11 is detected and an assist force corresponding to that steering condition is generated by a motor M so as to assist steering.

That is, an end of the steering shaft 12 is connected to the steering wheel 11 while an end of the torsion bar 14 is connected to the other end of the steering shaft 12. Further, an end of the pinion shaft 13 is connected to the other end of the torsion bar 14 while the pinion gear of the rack pinion 18 is connected to the other end of this pinion shaft 13. The steering shaft 12 and the pinion shaft 13 are provided with angle sensors 15, 16 capable of detecting respective rotation angles (steering angles $\theta_1$, $\theta_2$) relatively or absolutely, these angles sensors being connected electrically to the ECU 20. As the angle sensors 15, 16, an absolute angle sensor such as absolute encoder, resolver or a relative angle sensor such as an incremental encoder is used.

Because mechanical rotation restricting portions called manual stopper are constructed on both ends of the torsion bar 14, the torsion angle of the torsion bar 14 is restricted to a certain angle (for example, ±6°). This prevents the torsion bar 14 from being damaged due to excessive increase of the torsion amount.

Consequently, the steering shaft 12 and the pinion shaft 13 can be connected through the torsion bar 14 so that they can be rotated relatively to each other. The rotation angle (steering angle $\theta_1$) of the steering shaft 12 and the rotation angle (steering angle $\theta_2$) of the pinion shaft 13 can be detected by the angle sensors 15, 16 respectively. Thus, the rotation angle of the steering shaft 12 can be detected by the angle sensor 15 as the steering angle $\theta_1$. Further, the torsion amount of the torsion bar 14 can be detected from a difference in angle (differential) between the steering angle $\theta_1$ of the steering shaft 12 by the angle sensor 15 and the steering angle $\theta_2$ of the pinion shaft 13 by the angle sensor 16, angle ratio or the like as a torsion angle.

The reduction gear 17 for transmitting a driving force generated by the motor M at a predetermined reduction ratio is meshed with the halfway of the pinion shaft 13 through a gear (not shown), so that the driving force of the motor M or the assist force is transmitted to the pinion shaft 13 by the reduction gear 17. Further, this motor M is provided with the motor rotation angle sensor 19 capable of detecting its rotation angle and the motor rotation angle sensor 19 is also connected electrically to the ECU 20. The absolute angle sensor such as the absolute encoder, resolver or the relative angle sensor such as the incremental encoder is used for the motor rotation angle sensor 19.

Because the rotation angle signals detected by the angle sensors 15, 16 and the motor rotation angle sensor 19 can be transmitted to the ECU 20, the ECU 20 can determine an assist force to be generated by the motor M based on each rotation angle signal as described later, Wheels (not shown) are coupled to both sides of the rack pinion 18 through a tie-rod or the like, Next, the electrical structure of the ECU 20 and the like which construct the electrically-powered steering apparatus 10 and the action thereof will be described with reference to FIG. 2.

Figure 2:
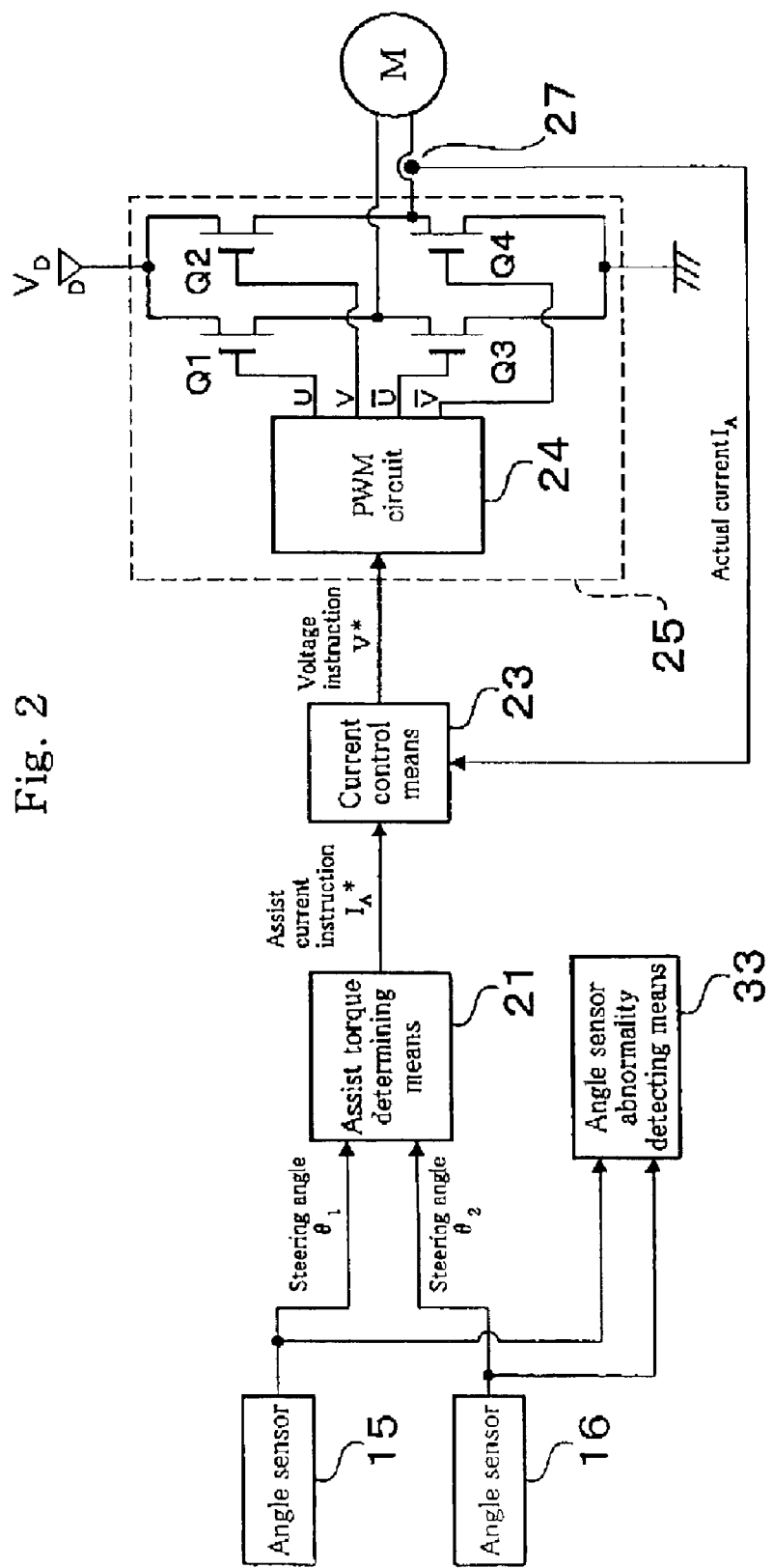
FIG. 2 is a block diagram showing the main electrical structure of ECU and motor driving circuit shown in FIG. 1.

As shown in FIG. 2, the ECU 20 comprises mainly an assist torque determining means 21, a current control means 23, an angle sensor abnormality detecting means 33 and the like and more specifically, is constituted of a CPU, memory devices, various kinds of interface circuits and the like.

The assist torque determining means 21 determines the assist force to be generated by the motor M according to the steering angle $\theta_1$ detected by the angle sensor 15 and the steering angle $\theta_2$ detected by the angle sensor 16. An assist current instruction $I_A^*$ is obtained by a map of the assist current instruction $I_A^*$ set up corresponding to a difference in angle (differential) between the steering angles $\theta_1$ and $\theta_2$, angle ratio and the like and a predetermined operational processing and the like.

Further, the assist torque determining means 21 is provided with a map for obtaining the assist current instruction $I_A^*$ from any one of the steering angles $\theta_1$, $\theta_2$, a predetermined operational processing and the like as well as the map about the assist current instruction $I_A^*$ set up preliminarily corresponding to the difference in angle between the steering angles $\theta_1$ and $\theta_2$ or the like. Consequently, the torsion amount of the torsion bar 14 can be detected from any one of the steering angles $\theta_1$, $\theta_2$ as a torsion angle.

The current control means 23 converts the assist current instruction $I_A^*$ determined by the assist torque determining means 21 to a voltage based on an actual current $I_A$ flowing through the motor M and outputs a voltage instruction $V^*$. That is, the current control means 23 outputs an object voltage instruction $V^*$ by negatively feeding back the actual current $I_A$ flowing through the motor M detected by a motor current detecting means 27.

A motor driving means 25 comprises a PWM circuit 24 and switching devices Q1–Q4. The PWM circuit 24 is a pulse width modulating circuit achieved by a hardware different from the ECU 20, which is capable of outputting pulse signals each having a pulse width corresponding to the voltage instruction $V^*$ outputted from the current control means 23 for each of phase U and phase V. Because the pulse signals of phase U and phase V corresponding to each gate of the switching devices Q1–Q4 connected to the output side can be provided, the motor M can be controlled arbitrarily by turning ON/OFF the switching devices Q1–Q4 corresponding to the pulse width.

Figure 3:
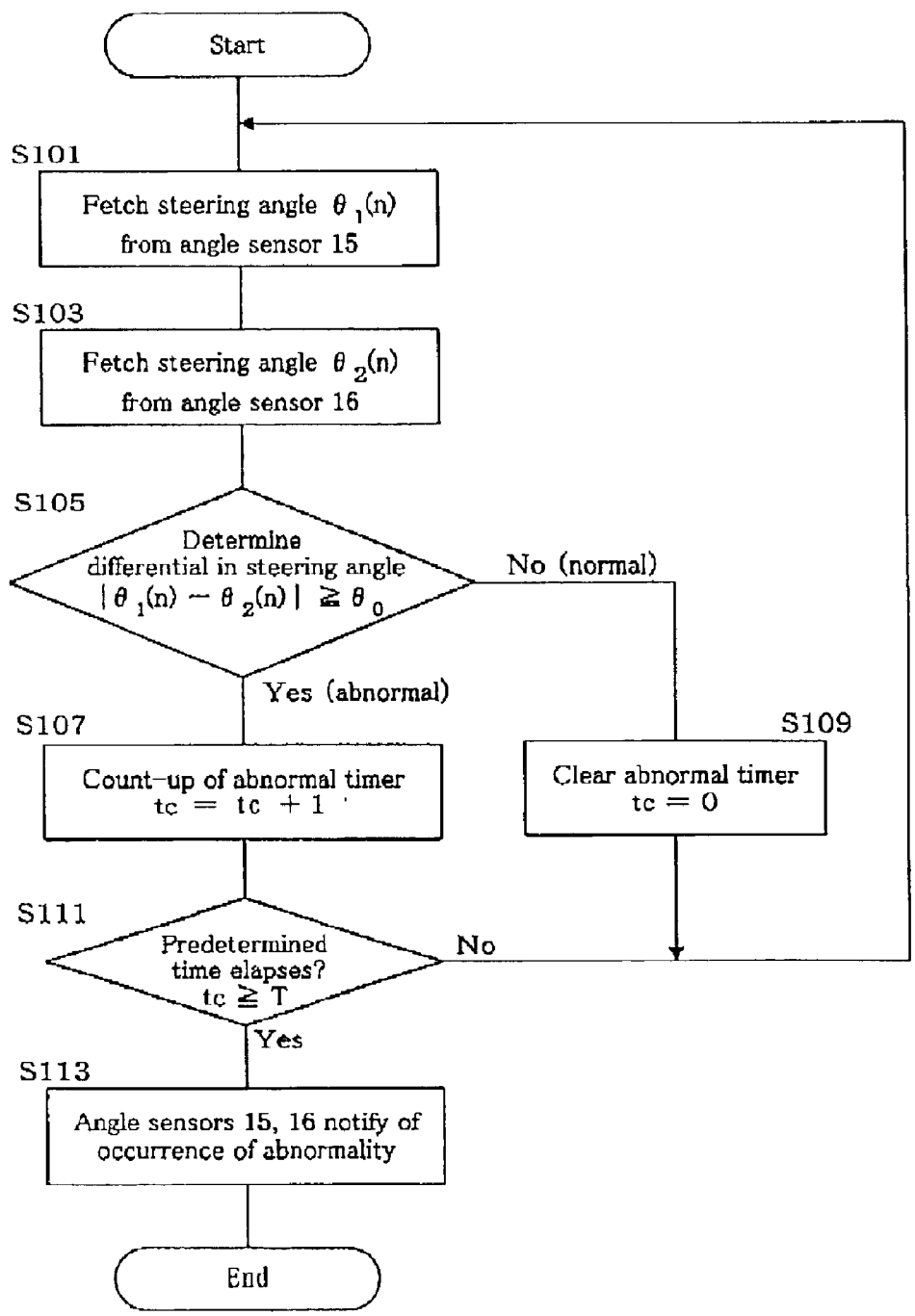
FIG. 3 is a flow chart showing the flow of abnormality detection processing of the angle sensor according to the first embodiment.

The angle sensor abnormality detecting means 33 can detect abnormalities in the angle sensors 15, 16 through the abnormality detection processing of the angle sensors shown in FIG. 3. The abnormality detection processing of this angle sensor is carried out by interruption processing which occurs every 5 milliseconds.

As shown in FIG. 3, the processing for fetching the steering angle $\theta_1(n)$ by the angle sensor 15 is carried out in the abnormality detecting processing of the angle sensors 15, 16 in step S101 and then, the processing for fetching the steering angle $\theta_2(n)$ by the angle sensor 16 is carried out in step S103. In the meantime, n in the parentheses attached after $\theta_1$ and $\theta_2$ are suffixes indicating a steering angle detected at the n time.

In subsequent step S105, a difference (absolute value) between the steering angle $\theta_1(n)$ detected by the angle sensor 15 and the steering angle $\theta_2(n)$ detected by the angle sensor 16 is acquired and whether or not that difference is equal to or over a predetermined value $\theta_0$ is determined. If that difference is equal to or over the predetermined value $\theta_0$ (Yes in S105), the processing proceeds to step S107 because an abnormality may exist in the angle sensor 15 or the angle sensor 16, in which count-up processing (tc=tc+1) of the abnormal timer tc is carried out. On the other hand, if the difference is not equal to nor over the predetermined value (No in S105), the processing proceeds to step S109 because the angle sensor 15 and the angle sensor 16 may be normal, in which clear processing (tc=0) of the abnormal timer is carried out.

After the processing by step S107 or step S109 is terminated, whether or not a predetermined time T (for example, 300 milliseconds–600 milliseconds) has elapsed with count-up continuing without clearing of the abnormal timer tc in the halfway, that is, whether or not the value of the abnormal timer tc has become equal to or over a predetermined value is determined in step S111. If it is determined that the abnormal timer tc has counted up in the interval of the predetermined time T (Yes in S111), it can be determined that an abnormality exists in the angle sensor 15 or the angle sensor 16 and therefore, processing for notifying a driver of the occurrence of the abnormality in the angle sensor 15, 16 is carried out by step S113 and then, a sequence of the abnormality detecting processing is terminated.

On the other hand, if it is determined that the abnormal timer tc has not counted up in the interval of the predetermined time T in step S113 (No in S111), it can be determined that no abnormality exists in the angle sensors 15, 16, and therefore, the sequence of the abnormality detecting processing is terminated.

Each processing of steps S107, S109, S111 corresponds to "when the condition in which the difference is equal to or over the predetermined value continues in the interval of the predetermined time".

This abnormality detecting processing flow may be changed by deleting the respective processings of steps S107, S109, S111 and then placing step S113 just after the determining of Yes in step S105 while proceeding the processing to step S101 if No is determined in the processing of step S105. Consequently, the abnormality in the angle sensor 15 (angle sensor 16) can be notified promptly in step S113 without waiting for a predetermined time and thus, high-speed abnormality detecting processing can be expected.

In the electrically-powered steering apparatus 10 (similar to the electrically-powered steering apparatus) of the first embodiment, the steering shaft 12 and the pinion shaft 13 are connected through the torsion bar 14 so that they can be rotated relatively to each other. The steering angle $\theta_1(n)$ of the steering shaft 12 and the steering angle $\theta_2(n)$ of the pinion shaft 13 are detected by the angle sensor 15 and the angle sensor 16 respectively. Then, the assist force to be generated by the motor M is determined by the assist torque determining means 21 based on at least one of the steering angle $\theta_1(n)$ of the steering shaft 12 and the steering angle $\theta_2(n)$ of the pinion shaft 13. When the difference ($|\theta_1(n)-\theta_2(n)|$) between the steering detection angle $\theta_1(n)$ detected by the angle sensor 15 and the steering detection angle $\theta_2(n)$ detected by the angle sensor 16 is equal to or over the predetermined value $\theta_0$, the angle sensor abnormality detecting means 33 detects that an abnormality has occurred in the angle sensor 15 or the angle sensor 16.

Consequently, the steering angle $\theta_1(n)$ of the steering shaft 12 can be detected and the torsion amount of the torsion bar 14 can be detected as a torsion angle from at least one of the steering angle $\theta_1(n)$ of the steering shaft 12 and the steering angle $\theta_2(n)$ of the pinion shaft 13. Thus, in case where self-aligning control is required for example, assist control taking into account the steering angle of the steering wheel 11 can be executed. Further, it can be detected that abnormality occurs in the angle sensor 15 or the angle sensor 16 from the difference ($|\theta_1(n)-\theta_2(n)|$) between the rotation angle of the steering shaft 12 and the rotation angle of the pinion shaft 13. Thus, the assist control based on the steering angle can be carried out and further, abnormality in the angle sensor 15 and the angle sensor 16 can be detected.

In the electrically-powered steering apparatus 10 (similar to the electrically-powered steering apparatus) of the first embodiment, the steering shaft 12 and the pinion shaft 13 are connected through the torsion bar 14 so that they can be rotated relative to each other. The steering angle $\theta_1(n)$ of the steering shaft 12 and the steering angle $\theta_2(n)$ of the pinion shaft 13 are detected by the angle sensor 15 and the angle sensor 16 respectively. Then, a assist force to be generated by the motor M is determined by the assist torque determining means 21 based on at least one of the steering angle $\theta_1(n)$ of the steering shaft 12 and the steering angle $\theta_2(n)$ of the pinion shaft 13. When such a condition in which the difference ($|\theta_1(n)-\theta_2(n)|$) between the steering detection angle $\theta_1(n)$ detected by the angle sensor 15 and the steering detection angle $\theta_2(n)$ detected by the angle sensor 16 is equal to or over the predetermined value $\theta_0$ continues in the interval of the predetermined time T, the angle sensor abnormality detecting means 33 detects that an abnormality has occurred in the angle sensor 15 or the angle sensor 16.

Consequently, the steering angle $\theta_1(n)$ of the steering shaft 12 can be detected and the torsion amount of the torsion bar 14 can be detected as a torsion angle from at least one of the steering angle $\theta_1(n)$ of the steering shaft 12 and the steering angle $\theta_2(n)$ of the pinion shaft 13. Thus, in case where self-aligning control is required for example, assist control taking into account the steering angle of the steering wheel 11 can be executed. Further, because the difference ($|\theta_1(n)-\theta_2(n)|$) between the rotation angle of the steering shaft 12 and the rotation angle of the pinion shaft 13 is detected in the interval of the predetermined time T, it can be certainly detected securely that abnormality occurs in the angle sensor 15 or the angle sensor 16. Thus, the assist control based on the steering angle can be carried out and further, abnormality in the angle sensor 15 and the angle sensor 16 can be detected.

[Second Embodiment]

First, the electrically-powered steering apparatus of the second embodiment will be described with reference to FIG. 4. This electrically-powered steering apparatus of the second embodiment corresponds to the electrically-powered steering apparatus.

The electrically-powered steering apparatus of the second embodiment is different from that of the first embodiment in that abnormality detecting processing of the angle sensor abnormality detecting means 33, which constitutes the electrically-powered steering apparatus of the first embodiment, is changed. Thus, other components adopt substantially the same structure as the electrically-powered steering apparatus of the first embodiment. Therefore, description thereof is omitted and if description of any component is necessary, it will be explained with reference to FIG. 1.

As shown in FIG. 4, the electrically-powered steering apparatus of the second embodiment carries out following abnormality detecting processing by means of the angle sensor abnormality detecting means 33 (FIG. 1). The abnormality detecting processing of this angle sensor is executed by interruption generated every five milliseconds like the abnormality detecting processing of the first embodiment. Hereinafter, the flow of the abnormality detecting processing with the angle sensors 15, 16 will be described.

In step S201, the processing for fetching the steering angle $\theta_1(n)$ by the angle sensor 15 is carried out and then, the processing for fetching the steering angle $\theta_2(n)$ by the angle sensor 16 is carried out in step S203. In the meantime, n in the parentheses attached after $\theta_1$ and $\theta_2$ are suffixes indicating a steering angle detected at the n time.

Next, whether or not the rotation directions of the steering detection angle $\theta_1(n)$ and the steering angle $\theta_2(n)$ are equal is determined in step S205. That is, because abnormality in the angle sensors 15, 16 can be detected more accurately by changing a parameter (for example, steering angle ratio $\alpha$, steering differential angle ratio $\beta$), which is used for abnormality determination, depending on whether the rotation directions of the steering angle $\theta_1(n)$ and the rotation direction of the steering angle $\theta_2(n)$ are equal or opposite to each other. Thus, in step S207, whether or not the rotation directions are equal or opposite to each other is determined on a sign (positive or negative) obtained by multiplying the steering detection angle $\theta_1(n)$ detected by the angle sensor 15 with a steering estimated angle $\theta_2(n)$ detected by the angle sensor 16.

If it is determined that the rotation directions are equal in step S205 (Yes in step S205), the processing proceeds to step S207, in which operational processing for obtaining a steering angle ratio $\alpha$, is executed, that is, a ratio $\alpha$ between the both is calculated by dividing the steering detection angle $\theta_1(n)$ detected by the angle sensor 15 by the steering estimated angle $\theta_2(n)$ detected by the angle sensor 16. In the meantime, this steering angle ratio $\alpha$ corresponds to "ratio $\alpha 10$".

In next step S209, a first predetermined value $\alpha 1$ and a second predetermined value $\alpha 2$ are obtained through a predetermined operation processing described later and then, whether or not the ratio $\alpha$ between the steering detection angle $\theta_1(n)$ and the steering estimated angle $\theta_2(n)$ exists in a range enclosed by the first predetermined value $\alpha 1$ and the second predetermined value $\alpha 2$ ($\alpha 2 \leq \alpha \leq \alpha 1$) is determined in step S211. If the ratio $\alpha$ exists in the range (Yes in step S211) as a result of the determination processing in step S211, the angle sensor 15 and the angle sensor 16 can be normal. Thus, the processing proceeds to step S215, in which the clear processing (tc=0) for the abnormality time to is carried out and the processing is returned to step S201. In the meantime, the first predetermined value $\alpha 1$ and the second predetermined value $\alpha 2$ correspond to "predetermined value $\alpha 11$" and "predetermined value $\alpha 12$".

On the other hand, unless the ratio $\alpha$ exists in that range (No in S211), abnormality can have occurred in the angle sensor 15 or the angle sensor 16. Thus, the processing proceeds to step S213, in which the count-up processing (tc=tc+1) of the abnormal timer tc is carried out. Further, whether or not the count-up continues for a predetermined time T without being cleared by the abnormal timer tc in step S217 or whether or not the value of the abnormal timer tc has become equal to or over the predetermined value is determined. If it is determined that the count-up of the abnormal timer continues for the predetermined time T (Yes in S217), it can be determined that abnormality has occurred in the angle sensor 15 or the angle sensor 16. Thus processing for notifying a driver of an occurrence of the abnormality is carried out in step S219. Then, a sequence of the abnormality detecting processing is terminated.

If it is determined that the rotation directions are not equal or the rotation directions of the steering detection angle $\theta_1(n)$ and the steering estimated angle $\theta_2(n)$ are opposite to each other (No in step S205), the processing proceeds to step S221. Then, operational processing for obtaining steering differential angle ratio $\beta$ is carried out, that is, the steering detection angle $\theta_1(n)$ minus the steering estimated angle $\theta_2(n)$ is divided by the steering estimated angle $\theta_2(n)$ and the sign is inverted ($\beta=-(\theta_1(n)-\theta_2(n)/\theta_2(n))$), so as to calculate the steering differential angle ratio $\beta$.

In step S223, a first predetermined value $\beta 1$ is obtained through the operational processing described later and whether or not the steering differential angle ratio $\beta$ obtained in step S221 is smaller than this first predetermined value $\beta 1$ is determined in step S225. If it is determined that the steering differential angle ratio $\beta$ is smaller than the first predetermined value $\beta 1$ (Yes in S225) through the determining processing of step S225, the angle sensor 15 and the angle sensor 16 can be normal. Thus, the processing proceeds to step S229, in which the clear processing (tc=0) of the abnormal timer tc is carried out and then, the processing is returned to step S201.

On the other hand, unless it can be determined that the steering differential angle ratio $\beta$ is smaller than the first predetermined value $\beta 1$ (No in S225), abnormality can have occurred in the angle sensor 15 or the angle sensor 16. Thus, the processing proceeds to step S227, in which the count-up processing (tc=tc+1) of the abnormal timer tc is carried out. Further, whether or not the count-up continues for the predetermined time T (for example, 300 milliseconds–600 milliseconds) without being cleared by the abnormal timer tc in step S231, that is, whether or not the value of the abnormal timer tc has become equal to or over a predetermined value is determined. If it is determined that the count-up of the abnormal timer tc continues for the predetermined time T (Yes in S231), it can be determined that abnormality occurs in the angle sensor 15 or the angle sensor 16. Therefore, the processing for notifying a driver of the occurrence of the abnormality in the angle sensors 15, 16 is carried out. Then, the sequence of the abnormality detecting processing is terminated.

In the meantime, the respective processings of step S213, S215, S217 correspond to "when the condition in which the ratio $\alpha 10$ is in the range between a predetermined value $\alpha 11$ and a predetermined value $\alpha 12$".

This abnormality detecting processing flow may be changed by deleting the respective processings of steps S213, S215, S217 and then placing step S219 just after a determining of No in step S211 while proceeding the processing to step S201 if Yes is determined in the processing of step S211. Further, this abnormality detecting processing flow may be changed by deleting the respective processings of steps S227, S229, S231 and then placing step S219 just after a determining of No in step S225 while proceeding the processing to step S201 if Yes is determined in the processing of step S225.

Consequently, the abnormality in the angle sensor 15 (angle sensor 16) can be notified promptly in step S219 without waiting for a predetermined time and thus, high-speed abnormality detecting processing can be expected.

Although whether or not the rotation directions of the steering detection angle $\theta_1(n)$ and the steering estimated angle $\theta_2(n)$ are equal is determined in step S205, the respective processings of step S205, S221, S223, S225, S227, S229, S231 may be deleted in viewpoints of simplifying and accelerating the abnormality detection processing.

Here, "operation for the first and second predetermined values $\alpha 1$, $\alpha 2$" executed in step S209 and "operation for the first predetermined value $\beta 1$" executed in step S223 will be described.

Because "detection error" can be generated by mechanical backlash in the reduction gear 17 or a torsion angle of the torsion bar 14 in the above-described angle sensors 15, 16, it is known that the steering angles $\theta_1$, $\theta_2$ detected by the angle sensors 15, 16 have a differential below a predetermined value. Therefore, according to the second embodiment, an influence due to this difference is absorbed by computing the first predetermined value $\alpha 1$ and the second predetermined value $\theta 2$ in step S209 and the first predetermined value $\beta 1$ in step S223.

Hereinafter, the way for computing the predetermined value $\alpha 1$, $\alpha 2$, $\beta 1$ will be described.

Assuming that the differential (predetermined value) generated by backlash or the like in the reduction gear 17 is $\Delta\theta_0(\Delta\theta_0>0)$, $|\theta_1(n)-\theta_2(n)| \leq \Delta\theta_0$ is satisfied.

Assuming that a differential which can be generated actually is $\Delta\theta$, $\theta_1(n)=\theta_2(n)+\Delta\theta$ satisfied. Thus, when the rotation directions of the steering detection angle $\theta_1(n)$ and the steering estimated angle $\theta_2(n)$ are equal, or $\theta_1(n)\cdot\theta_2(n) >0$, if both sides of $\theta_1(n)=\theta_2(n)+\Delta\theta$ is divided by $\theta_2(n)$, a following expression is obtained. Further, because $-\Delta\theta_0 \leq \Delta\theta \leq \Delta\theta_0$ is satisfied if the angle sensors 15, 16 are normal, the expression (1) can be modified to the expression (2).

[Expression 1]

$$\frac{\theta_1(n)}{\theta_2(n)} = 1 + \frac{\Delta\theta}{\theta_2(n)} \quad (1)$$

$$1 - \frac{\Delta\theta_0}{\theta_2(n)} \leq \frac{\theta_1(n)}{\theta_2(n)} \leq 1 + \frac{\Delta\theta_0}{\theta_2(n)} \quad (2)$$

Therefore, whether or not the angle sensors 15, 16 are normal can be determined based on determination thresholds $\alpha 1$, $\alpha 2$ provided from a following expression (3).

[Expression 2]

$$\alpha 1 = 1 + \frac{\Delta\theta_0}{\theta_2(n)} \quad (3)$$

$$\alpha 2 = 1 - \frac{\Delta\theta_0}{\theta_2(n)}$$

On the other hand, when the rotation directions of the steering detection angle $\theta_1(n)$ and the steering estimated angle $\theta_2(n)$ are opposite to each other or $\theta_1(n)\cdot\theta_2(n)<0$ is satisfied, if both sides of the $\theta_1(n)=\theta_2(n)+\Delta\theta$ is divided by $\theta_2(n)$, following expressions (4), (5) are obtained.

If the angle sensors 15, 16 are normal, when the $\theta_2(n)<0$ ($\theta_1(n)>0$), $\Delta\theta \leq \Delta\theta_0$ is satisfied because $\Delta\theta=\theta_1(n)-\theta_2(n)>0$. Thus, the expressions (4), (5) can be modified to a following expression (6). When $\theta_2(n)>0$ ($\theta_1(n)<0$) also, the following expression (6) is obtained.

[Expression 3]

$$\frac{\theta_1(n)}{\theta_2(n)} = 1 + \frac{\Delta\theta}{\theta_2(n)} < 0 \quad (4)$$

$$1 > -\frac{\Delta\theta}{\theta_2(n)} \quad (5)$$

-continued $$-\frac{\Delta\theta}{\theta_2(n)} \leq \frac{\Delta\theta_0}{|\theta_2(n)|} \quad (6)$$

Thus, whether or not the angle sensors 15, 16 are normal can be determined based on a determining threshold β1 provided by a following expression (7).

[Expression 4]

$$\beta 1 = \frac{\Delta\theta_0}{\theta_2(n)} \quad (7)$$

Because these predetermined values α1, α2, β1 are computed in this way, they change depending on the steering detection angles $\theta_1(n)$, $\theta_2(n)$ detected by the angle sensors 15, 16. That is, this apparatus can determine whether or not any abnormality exists in the angle sensor 15 and the angle sensor 16 by corresponding dynamically to changes in the steering detection angles $\theta_1(n)$, $\theta_2(n)$. The aforementioned $\Delta\theta_0$ is set at, for example, 12° (±6°) taking into account a manual stopper of the torsion bar 14.

In the electrically-powered steering apparatus 10 (similar to the electrically-powered steering apparatus) of the second embodiment, the steering shaft 12 and the pinion shaft 13 are connected through the torsion bar 14 so that they can be rotated relative to each other. The steering angle of the steering shaft 12 and the steering angle of the pinion shaft 13 are detected by the angle sensor 15 and the angle sensor 16 respectively. Then, the assist force to be generated by the motor M is determined by the assist torque determining means 21 based on at least one of the steering angle of the steering shaft 12 and the steering angle of the pinion shaft 13. If the ratio α (α10) between the rotation angle $\theta_1(n)$ of the steering shaft 12 detected by the angle sensor 15 and the rotation angle $\theta_2(n)$ of the pinion shaft 13 detected by the angle sensor 16 is in the range between the predetermined value α1 (α11) and the predetermined value α2 (α12), it is detected that abnormality occurs in the angle sensors 15 or the angle sensor 16 by the angle sensor abnormality detecting means 33.

Consequently, the steering angle $\theta_1(n)$ of the steering shaft 12 can be detected and the torsion amount of the torsion bar 14 can be detected as a torsion angle from at least one of the steering angle $\theta_1(n)$ of the steering shaft 12 and the steering angle $\theta_2(n)$ of the pinion shaft 13. Thus, assist control taking into account the steering angle of the steering wheel 11 can be executed. Further, it can be detected that abnormality occurs in the angle sensor 15 or the angle sensor 16 from the ratio α (α10) between the rotation angle $\theta_1(n)$ of the steering shaft 12 and the rotation angle $\theta_2(n)$ of the pinion shaft 13 of the pinion shaft 13. Thus, the assist control based on the steering angle can be carried out and any abnormality in the angle sensor 15 and the angle sensor 16 can be detected.

In the electrically-powered steering apparatus 10 (similar to the electrically-powered steering apparatus) of the second embodiment, the steering shaft 12 and the pinion shaft 13 are connected through the torsion bar 14 so that they can be rotated relatively to each other. The steering angle of the steering shaft 12 and the steering angle of the pinion shaft 13 are detected by the angle sensor 15 and the angle sensor 16 respectively. Then, an assist force to be generated by the motor M is determined by the assist torque determining means 21 based on at least one of the steering angle of the steering shaft 12 and the steering angle of the pinion shaft 13. Further, if a condition in which the ratio α (α10) between the rotation angle $\theta_1(n)$ of the steering shaft 12 detected by the angle sensor 15 and the rotation angle $\theta_2(n)$ of the pinion shaft 13 detected by the angle sensor 16 is in the range between the predetermined value α1 (α11) and the predetermined value α2 (α12) continues for the predetermined time T, the angle sensor abnormality detecting means 33 detects that abnormality occurs in the angle sensor 15 or the angle sensor 16.

Consequently, the steering angle $\theta_1(n)$ of the steering shaft 12 can be detected and the torsion amount of the torsion bar 14 can be detected as a torsion angle from at least one of the steering angle $\theta_1(n)$ of the steering shaft 12 and the steering angle $\theta_2(n)$ of the pinion shaft 13. Thus, assist control taking into account the steering angle of the steering wheel 11 can be executed. Further, because the ratio α10 between the rotation angle $\theta_1(n)$ of the steering angle 12 and the rotation angle $\theta_2(n)$ of the pinion shaft 13 continues to be detected for the predetermined time T, it can be certainly detected securely that abnormality occurs in the angle sensor 15 or the angle sensor 16. Therefore, the assist control based on the steering angle can be executed and abnormality in the angle sensor 15 and the angle sensor 16 can be detected more accurately.

Further, in the electrically-powered steering apparatus of the second embodiment (similar to the electrically-powered steering apparatus), the predetermined value α1 (α11) and the predetermined value α2 (α12) change based on the rotation angle $\theta_1(n)$ of the steering shaft detected by the angle sensor 15 and the rotation angle $\theta_2(n)$ of the pinion shaft 13 detected by the angle sensor 16. Consequently, this apparatus can determine whether or not abnormality exists in the angle sensor 15 or the angle sensor 16 corresponding dynamically to changes in the rotation angle $\theta_1(n)$ of the steering shaft 12 or the rotation angle $\theta_2(n)$ of the pinion shaft 13. Therefore, the abnormality in the angle sensor 15 and the angle sensor 16 can be detected more accurately.

Although the invention has been disclosed in the context of a certain preferred embodiments, it will be understood that the present invention extends beyond the specifically disclosed embodiments to other alternative embodiments of the invention. Thus, it is intended that the scope of the invention should not be limited by the disclosed embodiments but should be determined by reference to the claims that follow.

What is claimed is:

1. An electrically-powered steering apparatus for assisting steering of wheels by detecting a steering condition and generating an assist force corresponding to the steering condition by means of a motor, comprising:

a torsional member for connecting a steering shaft coupled with a steering wheel and a steering mechanism shaft coupled with a steering mechanism to each other such that they can be rotated relatively to each other;

a first angle detecting means for detecting a rotation angle of said steering shaft;

a second angle detecting means for detecting a rotation angle of said steering mechanism shaft;

an assist force determining means for determining said assist force generated by said motor based on at least one of the rotation angle of said steering shaft detected by said first angle detecting means and the rotation angle of said steering mechanism shaft detected by said second angle detecting means; and an abnormality detecting means for if a condition in which a differential between the rotation angle of said steering shaft detected by said first angle detecting means and the rotation angle of said steering mechanism shaft detected by said second angle detecting means is equal to or over a predetermined value continues for a predetermined time, detecting that abnormality occurs in said first angle detecting means or said second angle detecting means.

2. An electrically-powered steering apparatus for assisting steering of wheels by detecting a steering condition and generating an assist force corresponding to the steering condition by means of a motor, comprising:

a torsional member for connecting a steering shaft coupled with a steering wheel and a steering mechanism shaft coupled with a steering mechanism to each other such that they can be rotated relatively to each other;

a first angle detecting means for detecting a rotation angle of said steering shaft; a second angle detecting means for detecting a rotation angle of said steering mechanism shaft;

an assist force determining means for determining said assist force generated by said motor based on at least one of the rotation angle of said steering shaft detected by said first angle detecting means and the rotation angle of said steering mechanism shaft detected by said second angle detecting means; and an abnormality detecting means for if the ratio $\alpha 10$ between the rotation angle of said steering shaft detected by said first angle detecting means and the rotation angle of said steering mechanism shaft detected by said second angle detecting means is in the range between a predetermined value $\alpha 11$ and a predetermined value $\alpha 12$, detecting that abnormality occurs in said first angle detecting means or said second angle detecting means.

3. The electrically-powered steering apparatus as claimed in claim 2 wherein said predetermined value $\alpha 11$ and predetermined value $\alpha 12$ change based on the rotation angle of said steering shaft detected by said first angle detecting means or the rotation angle of said steering mechanism shaft detected by said second angle detecting means.

4. An electrically-powered steering apparatus for assisting steering of wheels by detecting a steering condition and generating an assist force corresponding to the steering condition by means of a motor, comprising:

a torsional member for connecting a steering shaft coupled with a steering wheel and a steering mechanism shaft coupled with a steering mechanism to each other such that they can be rotated relatively to each other;

a first angle detecting means for detecting a rotation angle of said steering shaft; a second angle detecting means for detecting a rotation angle of said steering mechanism shaft;

an assist force determining means for determining said assist force generated by said motor based on at least one of the rotation angle of said steering shaft detected by said first angle detecting means and the rotation angle of said steering mechanism shaft detected by said second angle detecting means; and an abnormality detecting means for if a condition in which the ratio $\alpha 10$ between the rotation angle of said steering shaft detected by said first angle detecting means and the rotation angle of said steering mechanism shall detected by said second angle detecting means is in the range between a predetermined value $\alpha 11$ and a predetermined value $\alpha 12$ continues for a predetermined time, detecting that abnormality occurs in said first angle detecting means or said second angle detecting means.

5. The electrically-powered steering apparatus as claimed in claim 4 wherein said predetermined value $\alpha 11$ and predetermined value $\alpha 12$ change based on the rotation angle of said steering shaft detected by said first angle detecting means or the rotation angle of said steering mechanism shaft detected by said second angle detecting means.

* * * * *